United States Patent
O

(10) Patent No.: US 8,848,085 B2
(45) Date of Patent: Sep. 30, 2014

(54) PHOTOGRAPHING APPARATUS CAPABLE OF COMMUNICATION WITH EXTERNAL APPARATUS AND METHOD OF CONTROLLING THE SAME

(75) Inventor: Seung-hun O, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 92 days.

(21) Appl. No.: 11/781,996

(22) Filed: Jul. 24, 2007

(65) Prior Publication Data
US 2008/0186385 A1 Aug. 7, 2008

(30) Foreign Application Priority Data
Feb. 6, 2007 (KR) ........................ 10-2007-0012228

(51) Int. Cl.
*H04N 5/222* (2006.01)
*H04M 1/725* (2006.01)
(Continued)

(52) U.S. Cl.
CPC ..... *H04M 1/7253* (2013.01); *H04N 2201/0084* (2013.01); *H04N 9/8205* (2013.01); *H04N 2201/3209* (2013.01); *H04N 9/804* (2013.01);
(Continued)

(58) Field of Classification Search
CPC .................. H04N 2201/00; H04N 2201/0055; H04N 2201/0084; H04N 2201/3204; H04N 2201/3205; H04N 2201/3209; H04N 2201/3266; H04N 2201/3273; H04N 2201/3274; H04N 2201/3278; H04N 1/00307; H04N 1/0044; H04N 9/804; H04N 9/8205; H04N 5/765; H04N 5/772; H04M 1/274525; H04M 1/27455; H04M 1/7253; H04M 1/72555; H04M 2250/02
USPC ................... 348/211.99, 211.1, 211.2, 211.3, 348/333.01, 333.02, 207.99, 207.1; 455/412.2; 386/46
See application file for complete search history.

(56) References Cited

U.S. PATENT DOCUMENTS 6,906,818 B1 * 6/2005 Makishima ................ 348/207.1
6,950,126 B1 * 9/2005 Homma et al. ........... 348/211.99
(Continued)

FOREIGN PATENT DOCUMENTS

CN  1589567 A  3/2005
CN  1625288 A  6/2005
(Continued)

OTHER PUBLICATIONS

Chinese Office Action issued Dec. 3, 2010 in CN Patent Application No. 200710197126.2.
(Continued)

*Primary Examiner* — Dennis Hogue
(74) *Attorney, Agent, or Firm* — Stanzione & Kim, LLP

(57) ABSTRACT

A photographing apparatus capable of performing communication with an external apparatus and a method of controlling the photographing apparatus. The photographing apparatus can communicate with an external apparatus and store data received from the external apparatus together with a photographed image, even while photographing the image. Additionally, the data received from the external apparatus can be stored in a form of metadata to connect data to the image, and thus it is possible to play back the data received from the external apparatus in a more lifelike manner.

6 Claims, 13 Drawing Sheets

(51) Int. Cl.
*H04M 1/2745* (2006.01)
*H04N 1/00* (2006.01)
*H04N 5/77* (2006.01)
*H04N 9/82* (2006.01)
*H04N 9/804* (2006.01)
*H04N 5/765* (2006.01)
*H04N 101/00* (2006.01)

(52) U.S. Cl.
CPC ... *H04N 2201/3205* (2013.01); *H04M 2250/02* (2013.01); *H04N 5/765* (2013.01); *H04N 2201/3266* (2013.01); *H04N 2201/3278* (2013.01); *H04N 2201/0055* (2013.01); *H04N 2201/3204* (2013.01); *H04N 2201/3273* (2013.01); *H04M 1/274525* (2013.01); *H04N 1/00307* (2013.01); *H04N 2201/3274* (2013.01); *H04M 1/27455* (2013.01); *H04N 1/0044* (2013.01); *H04N 5/772* (2013.01); *H04M 1/72555* (2013.01); *H04N 2101/00* (2013.01)
USPC .................................. 348/333.02; 348/207.1

(56) References Cited

U.S. PATENT DOCUMENTS

| | | | |
|---|---|---|---|
| 7,477,292 B2 * | 1/2009 | Sawanobori | 348/211.2 |
| 2002/0012048 A1 * | 1/2002 | Yamagishi | 348/333.02 |
| 2003/0063722 A1 * | 4/2003 | Han | 379/93.24 |
| 2004/0008258 A1 * | 1/2004 | Aas et al. | 348/207.1 |
| 2004/0203606 A1 * | 10/2004 | Souissi et al. | 455/412.1 |
| 2004/0218738 A1 * | 11/2004 | Arai et al. | 379/93.17 |
| 2005/0001024 A1 * | 1/2005 | Kusaka et al. | 235/375 |
| 2005/0225643 A1 * | 10/2005 | Grignani | 348/207.99 |
| 2005/0270407 A1 * | 12/2005 | Yamaguchi | 348/345 |
| 2006/0007315 A1 * | 1/2006 | Singh | 348/207.99 |
| 2006/0256212 A1 * | 11/2006 | Choi | 348/231.99 |
| 2007/0019077 A1 * | 1/2007 | Park | 348/211.99 |
| 2007/0237491 A1 * | 10/2007 | Kraft | 386/46 |

FOREIGN PATENT DOCUMENTS

| | | | | |
|---|---|---|---|---|
| JP | 2001-045351 | | 2/2001 | |
| JP | 2001-333323 | | 11/2001 | |
| JP | 2003153058 A | * | 5/2003 | H04N 5/225 |
| JP | 2005191899 A | * | 7/2005 | H04M 1/00 |

OTHER PUBLICATIONS

Korean Office Action dated Jun. 5, 2013 issued in KR Application No. 10-2007-0012228.

* cited by examiner

```
unsigned int   Clip file ID      ~501
unsigned int   picture size      ~502
unsigned int   picture type      ~503
char[]         picture name      ~504
unsigned int   profile type      ~505
unsigned int   sending time      ~506
char[][]       receive list      ~507
BOOL           icon_reg_flag     ~508
```

FIG. 7A

| | |
|---|---|
| unsigned char f_type | ~701 |
| unsigned int f_size | ~702 |
| unsigned int f_time | ~703 |
| unsigned int f_recv_time | ~704 |
| char[] f_name | ~705 |
| char[] f_data | ~706 |
| unsigned int Clip file ID | ~707 |
| BOOL meta_flag | ~708 |
| char[] Icon_name | ~709 |
| meta_data* meta_next | ~710 |
| meta_data* meta_prev | ~711 |
| BOOL icon_reg_flag | ~712 |
| unsigned int icon_pos | ~713 |
| unsigned int fade_in_out | ~714 |

FIG. 7B

| | |
|---|---|
| 0x01 (TEXT DATA) | ~701-1 |
| 0x21 (33byte) | ~702-1 |
| null | ~703-1 |
| 07.01.20.18.32.52 | ~704-1 |
| 011-123-5678 | ~705-1 |
| What a beautiful spot!! Where is it? | ~706-1 |
| null | ~707-1 |
| null | ~708-1 |
| null | ~709-1 |
| null | ~710-1 |
| null | ~711-1 |
| null | ~712-1 |
| null | ~713-1 |
| null | ~714-1 |

FIG. 7C

| | |
|---|---|
| 0x01 (TEXT DATA) | ~701-1 |
| 0x21 (33byte) | ~702-1 |
| null | ~703-1 |
| 07.01.20.18.32.52 | ~704-1 |
| 011-123-5678 | ~705-1 |
| What a beautiful spot!! Where is it? | ~706-1 |
| null | ~707-1 |
| null | ~708-1 |
| 1x109 | ~709-1 |
| null | ~710-1 |
| null | ~711-1 |
| true | ~712-1 |
| 0x31 | ~713-1 |
| 0x51 | ~714-1 |

FIG. 7D

| | |
|---|---|
| 0x01 (TEXT DATA) | ~701-1 |
| 0x21 (33byte) | ~702-1 |
| null | ~703-1 |
| 07.01.20.18.30.40 | ~704-1 |
| 011-123-5678 | ~705-1 |
| What a beautiful spot!! Where is it? | ~706-1 |
| 2x123 | ~707-1 |
| true | ~708-1 |
| 1x109 | ~709-1 |
| null | ~710-1 |
| null | ~711-1 |
| true | ~712-1 |
| 0x31 | ~713-1 |
| 0x51 | ~714-1 |

| | |
|---|---|
| 0x02 (AUDIO DATA) | ~701-2 |
| 0x52 (54byte) | ~702-2 |
| 07.01.20.18.30.42 | ~703-2 |
| 07.01.20.18.40.01 | ~704-2 |
| Han-soo CHO | ~705-2 |
| ........ | ~706-2 |
| 2x543 | ~707-2 |
| true | ~708-2 |
| 2x100 | ~709-2 |
| null | ~710-2 |
| FIRST METADATA ADDRESS | ~711-2 |
| true | ~712-2 |
| 2x22 | ~713-2 |
| 3x52 | ~714-2 |

FIG. 9

| | |
|---|---|
| 0x01 (TEXT DATA) | ~701-3 |
| 0x31 (44byte) | ~702-3 |
| 07.01.20.19.00.00 | ~703-3 |
| 07.01.20.19.00.00 | ~704-3 |
| Chul-soo KIM | ~705-3 |
| What are you doing ? | ~706-3 |
| 2x543 | ~707-3 |
| true | ~708-3 |
| 3x100 | ~709-3 |
| null | ~710-3 |
| SECOND METADATA ADDRESS | ~711-3 |
| true | ~712-3 |
| 3x33 | ~713-3 |
| 4x44 | ~714-3 |

FIG. 10

```
unsigned int Clip file ID      ~1001
meta_data* first_meta_data     ~1002
meta_data* last_meta_data      ~1003
unsigned int meta_count        ~1004
unsigned int meta_text         ~1005
unsigned int meta_sound        ~1006
```

PHOTOGRAPHING APPARATUS CAPABLE OF COMMUNICATION WITH EXTERNAL APPARATUS AND METHOD OF CONTROLLING THE SAME

CROSS-REFERENCE TO RELATED APPLICATIONS

This application claims priority under 35 U.S.C. §119 (a) from Korean Patent Application No. 10-2007-0012228, filed on Feb. 6, 2007, in the Korean Intellectual Property Office, the disclosure of which is incorporated herein by reference in its entirety.

BACKGROUND OF THE INVENTION

1. Field of the Invention

The present general inventive concept relates to a photographing apparatus and a method of controlling the same. More particularly, the present general inventive concept relates to a photographing apparatus capable of communication with an external apparatus and a method of controlling the same.

2. Description of the Related Art

Photographing apparatuses photograph subjects to generate images that may then be stored. Representative examples of photographing apparatuses include digital cameras and digital camcorders. Photographing apparatuses may also display the images that have been photographed using photographing apparatuses and stored. The displayed images may, for example, be displayed on televisions (TVs) connected to the photographing apparatuses.

If users desire to communicate with external apparatuses while photographing images, photographing apparatuses may be used with separate communication devices. Alternatively, if photographing apparatuses have both photographing functions and communication functions, users may temporarily stop photographing and communicate with external apparatuses, thus increasing user inconvenience.

Additionally, a user may collect comments from other users while sharing the photographed image. When the photographed images are stored in a file on a personal computer (PC), other users' comments may be recorded using text. However, text does not have the ability to represent the feeling of movement at the time photographing operation is performed.

In addition, in order to enable other users may leave comments, the user may need to perform several operations other than photographing images, which may burden the user.

SUMMARY OF THE INVENTION

The present general inventive concept provides a photographing apparatus and a method of controlling the same, which enables the photographing apparatus to communicate with an external apparatus while photographing an image.

The present general inventive concept provides a photographing apparatus and a method of controlling the same, in which data received from an external apparatus is stored together with a photographed image to enhance user convenience.

Additional aspects and utilities of the present general inventive concept will be set forth in unit in the description which follows and, in unit, will be obvious from the description, or may be learned by practice of the general inventive concept.

The foregoing and/or other aspects and utilities of the present general inventive concept may be achieved by providing a photographing apparatus including an image photographing unit to photograph an image, a storage unit to store the photographed image, a display unit to display the photographed image, a communication interface to communicate with an external apparatus and a controller to control such that a notification message to indicate that data has been received is generated and displayed on the display unit together with the photographed image, if the communication interface receives data from the external apparatus.

The external apparatus may include a mobile phone, and the communication interface may perform short-range communication with the mobile phone.

The mobile phone may perform long-range communication with another mobile phone and may transmit an image received from the communication interface to the other mobile phone or transmit data received from the other mobile phone to the communication interface.

The received data may include at least one of audio data and text data.

The controller may store the received data in the storage unit in which the photographed image is stored, if a storage command to store the received data is input.

The photographing apparatus may further include a compressor to compress audio data. If the received data is in a form of audio data, the compressed audio data output from the compressor may be stored in the storage unit.

When the received data is stored in the storage unit, the controller may generate metadata including information regarding the received data and the image and may store the generated metadata in the storage unit.

The foregoing and/or other aspects and utilities of the present general inventive concept may also be achieved by providing a method of controlling a photographing apparatus, including photographing an image, displaying the photographed image and performing communication with an external apparatus. If the data is received from the external apparatus, the displaying of the photographed image includes displaying a notification message to indicate that data has been received together with the photographed image.

The external apparatus may include a mobile phone, and the performing may include performing short-range communication with the mobile phone.

The mobile phone may perform long-range communication with another mobile phone and may transmit an image received from the photographing apparatus to the other mobile phone or transmit data received from the other mobile phone to the photographing apparatus.

The received data may include at least one of audio data and text data.

The method may further include storing the received data in a storage unit in which the photographed image is stored, if a storage command to store the received data is input.

The method may further include compressing audio data if the received data is in a form of audio data.

The method may further include generating metadata including information regarding the received data and the image. The storing may include storing the metadata and the image.

The foregoing and/or other aspects and utilities of the general inventive concept may also be achieved by providing a photographing apparatus usable with an external device, the apparatus including an image photographing unit to photograph an image, a communication interface to communicate with the external apparatus and a controller to determine whether data has been received from the external unit through the communication interface and, if so, to display together with the photographed image of the photographing unit, a notification message that the data has been received.

The foregoing and/or other aspects and utilities of the general inventive concept may also be achieved by providing a photographing apparatus usable with an external device, the apparatus including a photographic mode in which an image is photographed and stored without communication with the external device, a communication mode in which communication with the external device is enabled while the image is being photographed and the image is stored with the data communicated by the external device, and a selection button for selecting one of the photographic mode and the communication mode.

The foregoing and/or other aspects and utilities of the general inventive concept may also be achieved by providing a photographing system, including a photographing apparatus to photograph an image, the photographing apparatus having a photographic mode and a communication mode, a first mobile phone to communicate with the photographing apparatus and a second mobile phone to communicate with the first mobile phone, wherein the photographing apparatus receives data from the second mobile phone through the first mobile phone while photographing the image, when in the communication mode.

The foregoing and/or other aspects and utilities of the general inventive concept may also be achieved by providing a method of operating a photographing apparatus, the method including photographing an image, communicating with an external apparatus, and determining whether data has been received from the external unit and, if so, displaying a notification message that the data has been received together with the photographed image of the photographing unit.

The foregoing and/or other aspects and utilities of the general inventive concept may also be achieved by providing a method of operating a photographing apparatus, the method including determining whether a photographic mode or a communication mode has been selected, if a photographic mode has been selected, preventing communication with an external device during the photographing of an image, and if a communication mode has been selected, allowing communication with the external device during the photographing of the image.

The foregoing and/or other aspects and utilities of the general inventive concept may also be achieved by providing a computer-readable recording medium having embodied thereon a computer program to execute a method, wherein the method includes determining whether a photographic mode or a communication mode has been selected, if a photographic mode has been selected, preventing communication with an external device during the photographing of an image, and if a communication mode has been selected, allowing communication with the external device during the photographing of the image.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIGS. 7A to 7D are views illustrating a data structure of metadata, according to an exemplary embodiment of the present general inventive concept;

FIG. 9 is a view illustrating a data structure of third metadata which is generated using data received from a fourth mobile phone; and FIG. 10 is a view illustrating a data structure of image management data.

DETAILED DESCRIPTION OF THE PREFERRED EMBODIMENTS

Figure 1:
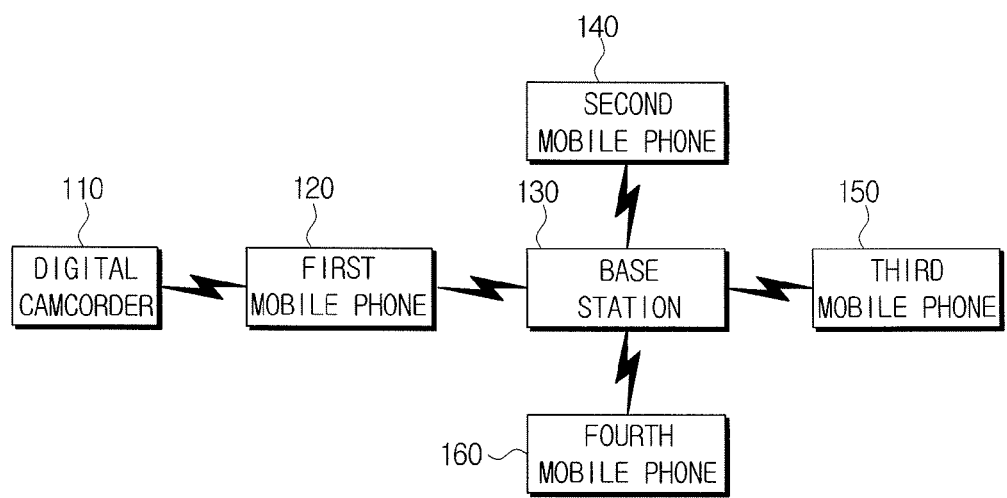
FIG. 1 is a view illustrating photographing apparatus and a plurality of mobile phones which are connected via a network, according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a view illustrating photographing apparatus and a plurality of mobile phones that are connected via a network, according to an exemplary embodiment of the present general inventive concept. In FIG. 1, a digital video camcorder (DVC) 110, a first mobile phone 120, a second mobile phone 140, a third mobile phone 150 and a fourth mobile phone 160 can be connected via the network.

The DVC 110 can photograph an image and transmit the photographed image to an external apparatus, that is, for example, the first mobile phone 120, second mobile phone 140 and third mobile phone 150. Specifically, the image photographed by the DVC 110 can be transmitted to the first mobile phone 120 using short-range wireless communication, such as Bluetooth. Additionally, the first mobile phone 120 can transmit the image to the second mobile phone 140 and third mobile phone 150 using long-range wireless communication, in particular a base station 130. Furthermore, the second to fourth mobile phones 140 to 160 can transmit data to the DVC 110 through the first mobile phone 120. Accordingly, the DVC 110 can perform data communication with the second to fourth mobile phones 140 to 160 through the first mobile phone 120.

If a user of the DVC 110 desires to share a specific image with a third party (for example, a user of the second mobile phone 140 or a user of the third mobile phone 150) which is spatially separated from the user of the DVC 110 while photographing an image, the specific image can be transmitted to the first mobile phone 120 using short-range wireless communication, and the first mobile phone 120 can transmit the received image to the second mobile phone 140 and third mobile phone 150 using long-range wireless communication. A short message service (SMS) can be used when transmitting the image from the first mobile phone 120 to the second mobile phone 140 and third mobile phone 150. Accordingly, the user of the DVC 110, user of the second mobile phone 140 and user of the third mobile phone 150 can share the same image.

Additionally, the DVC 110 and mobile phones 140 and 150 can perform data communication, and thus the user of the second mobile phone 140 and user of the third mobile phone 150 can leave comments regarding the image being photographed in real-time and the comments can be stored together with the image.

Hereinafter, description will be given in detail of a method in which several users can share a single image and data received from an external apparatus can be stored together with the image.

Figure 2:
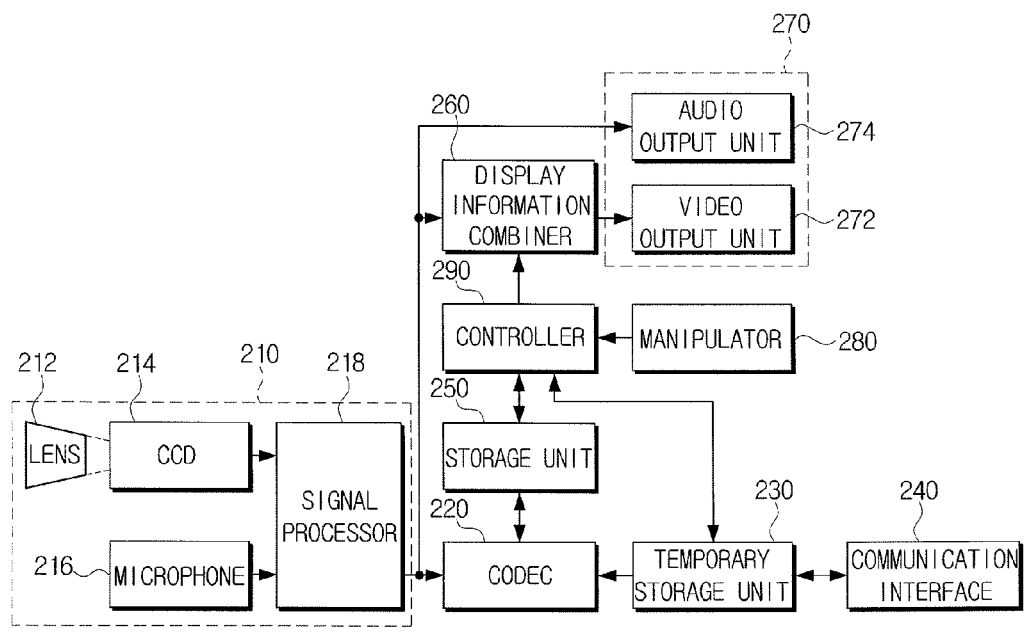
FIG. 2 is a block diagram illustrating a digital camcorder according to an exemplary embodiment of the present general inventive concept.

The DVC 110 to store the data received from the external apparatuses together with the image will be now described with reference to FIG. 2. FIG. 2 is a block diagram illustrating the DVC 110 according to an exemplary embodiment of the present general inventive concept. In FIG. 2, the DVC 110 includes an image photographing unit 210, a coder/decoder (CODEC) 220, a temporary storage unit 230, a communication interface 240, a storage unit 250, a display information combiner 260, an image output unit 270, a manipulator 280, and a controller 290.

The image photographing unit 210 can include a lens 212, a charge-coupled device (CCD) 214, a microphone 216, and a signal processor 218.

The CCD 214 can capture an optical image of a subject incident through the lens 212 and generate a video signal corresponding to the photographed optical image. The photographing apparatus according to the exemplary embodiment of the present general inventive concept can be implemented by a complementary metal oxide semiconductor (CMOS) type instead of the CCD 114.

The signal processor 218 can remove noise, adjust a level of the video signal, convert an analog signal into a digital signal, and perform digital signal processing (DSP) for the video signal output from the CCD 214. The signal processor 218 can also amplify an audio signal output from the microphone 216 and convert the audio signal into a digital signal.

The CODEC 220 can compress the video and audio signals (hereinafter, referred to as "images") processed by the signal processor 218 in a predetermined format and transfer the compressed images to the storage unit 250. Alternatively, the CODEC 220 can decode an image output from the storage unit 250 or the temporary storage unit 230 into a re-playable original signal and transfer the re-playable original signal to the image output unit 270.

The temporary storage unit 230 can temporarily store the specific image compressed by the CODEC 220 before transmitting the image to the communication interface 240, and can also temporarily store data received from the communication interface 240.

The communication interface 240 can modulate the image output from the temporary storage unit 230 to wirelessly transmit the image, and transfer the data received from the external apparatus to the temporary storage unit 230. The communication interface 240 may be a Bluetooth module or a wireless local area network (LAN) module to perform short-range wireless communication.

The storage unit 250 can store the image compressed by the CODEC 220. Additionally, the storage unit 250 can store metadata output from the controller 290, together with the image. The metadata includes the data received from the external apparatus and various information required to connect the data received from the external apparatus to the image.

The display information combiner 260 can combine the video signal output from the signal processor 218 with display information such as characters, symbols, diagrams, graphics or other information. The display information combiner 260 can combine the display information using an on-screen display (OSD) method under the control of the controller 290.

The image output unit 270 can include a video output unit 272 to display the video signal, and an audio output unit 274 to output the audio signal. The video output unit 272 can be implemented as a liquid crystal display (LCD) or the like, and the audio output unit 274 can be implemented as a speaker or the like. The video output unit 272 can also display functions of the manipulator 280, or can be used as a part of the manipulator 280.

The manipulator 280 includes a selection button through which a mode of the DVC 110 can be selected. A user may execute a photographing command or transmit the photographed image to the external apparatus and may also receive text data or audio data from the external apparatus, using the manipulator 280 including the selection button. Modes of the DVC 110 according to an exemplary embodiment of the present general inventive concept include a "photographing mode" and a "communication mode". The "photographing mode", as a general function of the DVC 110, refers to a mode in which an image is photographed and the photographed image is stored. The "communication mode" refers to a mode in which a photographed image is stored and communication with an external apparatus is performed while photographing an image.

The controller 290 can control the entire operation of the DVC 110. For example, if the user inputs a command to change the mode of the DVC 110 to the "communication mode" through the manipulator 280, the controller 290 can store the image compressed by the CODEC 220 in the storage unit 250, and also transmit the compressed image to the external apparatus using the communication interface 240. Additionally, if the compressed image is transmitted, the controller 290 can generate information regarding the transmitted image in the form of a data structure and store the information in the temporary storage unit 230.

If the communication interface 240 receives data from the external apparatus and the received data is stored in the temporary storage unit 230, the controller 290 can generate a notification message to indicate that data has been received and can transfer the generated notification message to the display information combiner 270. The controller 290 can also transfer the received data to the image output unit 270 or store the data in the storage unit 250. When storing the received data in the storage unit 250, the controller 290 can generate metadata to connect the data to the image and can store the metadata together with the image in the storage unit 250.

Additionally, the controller 290 can control the image output unit 270 to output the image processed by the signal processor 218, and the video output unit 272 to display information regarding a manipulation command input by the user using the manipulator 280.

Figure 3:
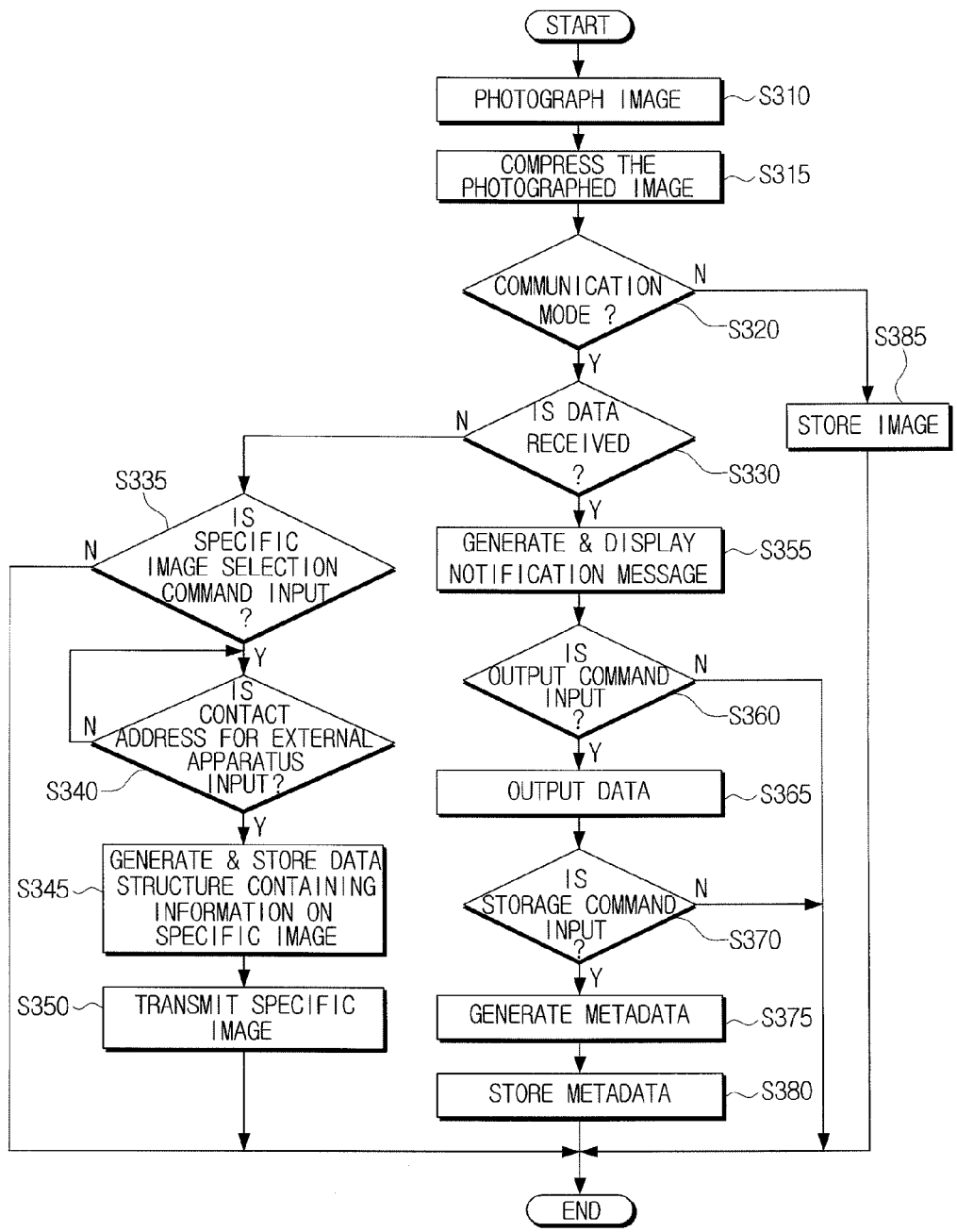
FIG. 3 is a flowchart illustrating a method of converting a specific image of a photographed moving image into a still image and transmitting the converted image, or of processing data received from an external apparatus, according to an exemplary embodiment of the present general inventive concept.

Hereinafter, a method by which the DVC 110 of FIG. 2 transmits an image to an external apparatus and a method by which the DVC 110 processes the data received from the external apparatus will be described in detail with reference to FIG. 3. FIG. 3 is a flowchart illustrating a method of converting a specific image of a photographed moving image into a still image and transmitting the converted image, or of processing data received from an external apparatus, according to an exemplary embodiment of the present general inventive concept.

In FIG. 3, the image photographing unit 210 can photograph an image in operation S310. Specifically, the CCD 214 can capture an optical image of a subject incident through the lens 212 and transfer the image to the signal processor 218. The microphone 216 can transfer an audio signal to the signal processor 218. The signal processor 218 can remove noise, adjust a level of the video signal, convert an analog signal into a digital signal, and perform digital signal processing (DSP) for the video signal output from the CCD 214. The signal processor 218 can also amplify the audio signal output from the microphone 216 and convert the audio signal into a digital signal. The CODEC 220 can compress the photographed image in a predetermined format in operation S315.

The controller 290 can determine whether the mode of the DVC 110 is the communication mode in operation S320. Accordingly, the controller 290 can determine whether a user inputs a command to change the mode of the DVC 110 to the communication mode through the manipulator 280. If the mode of the DVC 110 is set to be in the communication mode, the DVC 110 can receive data from and transmit data to the external apparatus while photographing an image.

If it is determined that the mode of the DVC 110 is in the communication mode in operation S320-Y, the controller 290 can determine whether the communication interface 240 receives data in operation S330. Specifically, the controller 290 can determine whether the first mobile phone 120 receives data, such as text data or audio data, from the second to fourth mobile phones 140 to 160 and transmits the data to the DVC 110.

If it is determined that the data is not received in operation S330-N, the controller 290 can determine whether a specific image selection command is input in operation S335. Specifically, if a specific image which a user desires to share with a third party is photographed using the DVC 110 while photographing an image, a command to select the photographed image can be input. Accordingly, the specific photographed image can be compressed in a still image format by the CODEC 220 and stored in the temporary storage unit 230.

The controller 290 can also determine whether a contact address for the external apparatus is input in operation S340. The contact address for the external apparatus refers to numbers for the second mobile phone 140 and third mobile phone 150. The user can input the contact address for the external apparatus using a user interface provided by the DVC 110 or using a contact address for an external apparatus previously stored in the DVC 110. Additionally, since the DVC 110 can communicate with the first mobile phone 120, contact addresses stored in the first mobile phone 120 can be used.

If the contact address for the external apparatus is input in operation S340-Y, the controller 290 can generate a data structure including information regarding the selected specific image and store the generated data structure in the temporary storage unit 230 in operation S345. A method of generating a data structure will be described later.

The communication interface 240 can transmit the data structure of the specific image and the specific image to the external apparatus in operation S350. Specifically, if the communication interface 240 of the DVC 110 transmits the data structure of the specific image and the specific image to the first mobile phone 120 using short-range wireless communication, the first mobile phone 120 can transmit the data structure of the specific image and the specific image to the external apparatus using long-range wireless communication.

If it is determined that the data is received in operation S330-Y, the controller 290 can control the display information combiner 260 and the video output unit 272 so that a notification message to indicate data reception can be generated and the generated notification message can be displayed on the video output unit 272 in operation S355. More particularly, the data received by the communication interface 240 can be stored in the temporary storage unit 230, and the controller can read the data being stored in the temporary storage unit 230 and generate a notification message.

The controller 290 can generate various notification messages according to the types of data. Accordingly, if the received data is text data or audio data, different types of notification messages can be generated to be transferred to the display information combiner 260, and the display information combiner 260 can combine the notification message with a region of the photographed image and the combined image can be transferred to the video output unit 272. Accordingly, various notification messages can be generated according to the types of data, and thus enable the user to easily identify the type of data received.

The controller 290 can determine whether an output command to output the received data is input in operation S360. The user can check that the notification message is displayed on the video output unit 272 while photographing a moving image, and can input the output command.

If the output command is input in operation S360-Y, the controller 290 can output the received data being stored in the temporary storage unit 230 in operation S365. Specifically, if the received data is text data, the controller 290 can read the text data being stored in the temporary storage unit 230 and convert the data into original text data, followed by transferring the original data to the display information combiner 260. The display information combiner 260 can combine the text data with the image output from the signal processor 218 and transfer the combined image to the video output unit 272. The video output unit 272 can output the image combined with the text data. Alternately, if the received data is audio data, the controller 290 can read the audio data being stored in the temporary storage unit 230 and transfer the data to the CODEC 220. The CODEC 220 can then decode the audio data into a re-playable original signal and transfer the re-playable original signal to the audio output unit 274, and the audio output unit 274 can output the audio data.

The controller 290 can determine whether a storage command to store the data output from the image output unit 270 is input in operation S370. Specifically, if the user desires to store the output data together with the photographed image, the user can input the storage command, and the controller 290 can determine that the storage command is input.

If it is determined that the storage command is input in operation S370-Y, the controller 290 can generate metadata to connect the output data to the image in operation S375. The metadata can include information regarding the output data along with information regarding the image. If the storage command is input, the controller 290 can generate metadata based on whether the data is associated with the data structure transmitted at operation S350. A method of generating metadata will be described later.

Subsequently, the controller 290 can store the generated metadata in the storage unit 250 in which the image is currently stored in operation S380.

If it is determined that the mode of the DVC 110 is not the communication mode in operation S320-N, the compressed image can be stored in the storage unit 250 in operation S385, because it is determined that the DVC 110 is in the photographing mode.

For convenience of description, it has been described that if the DVC 110 is in the communication mode, the controller 290 can determine whether data is received at operation S330 and can then determine whether the specific image selection command is input at operation S335, but the present general inventive concept is not limited thereto. Accordingly, if the DVC 110 is in the communication mode, the controller 290 can determine whether data is received or whether the image is transmitted.

Figure 4A:
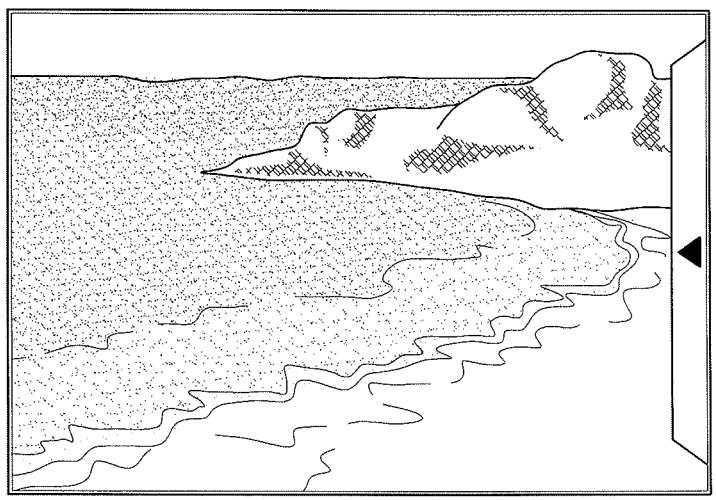
FIGS. 4A to 4E are views illustrating in detail a method of selecting a specific image from a photographed moving image and transmitting the specific image to an external apparatus.

FIGS. 4A to 4E are views illustrating in detail a method of selecting a specific image from a photographed moving image to be transmitted to an external apparatus. As illustrated in FIG. 4A, if a user desires to share the specific image with a third party while photographing the moving image, the user can select an arrow, that is, a user interface, displayed on a region of the video output unit 272.

Figure 4B:
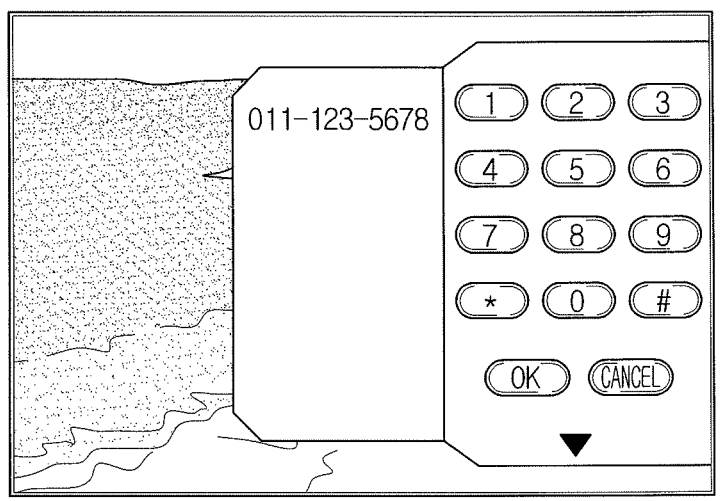

As illustrated in FIG. 4B, a window to input the contact address for the external apparatus can be displayed on a region of the video output unit 272. Since the contact address for the external apparatus can generally include numbers, a number input window is illustrated in FIG. 4B. For convenience of description, if the user of the DVC 110 inputs the contact address for the second mobile phone 140 using the number input window, the numbers illustrated in FIG. 4B may be the contact address for the second mobile phone 140.

Figure 4C:
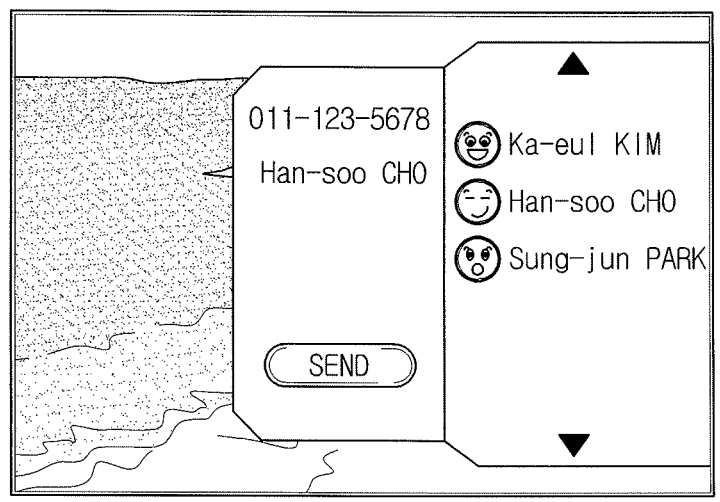
Figure 4D:
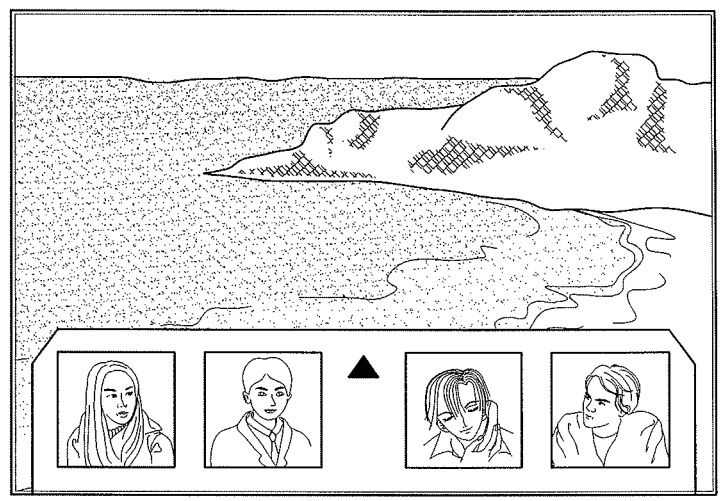

However, the present general inventive concept is not limited to this embodiment, so if the user selects a down arrow displayed on the number input window, a pre-registered contact address window for external apparatuses can be displayed, as illustrated in FIG. 4C. Accordingly, the user can input the contact address for the external apparatus using the pre-registered contact address window for external apparatuses. As illustrated in FIG. 4C, "Han-soo CHO" selected by the user may be the contact address for the third mobile phone 150, and accordingly the user can select the contact address for the external apparatus using the number input window of FIG. 4B and the pre-registered contact address window for external apparatuses of FIG. 4C, and can input a transmission command. If icons corresponding to the contact addresses for the external apparatuses are previously registered, the user can select the icons instead of the contact address for the external apparatus, as illustrated in FIG. 4D.

Figures 4E, 5A:
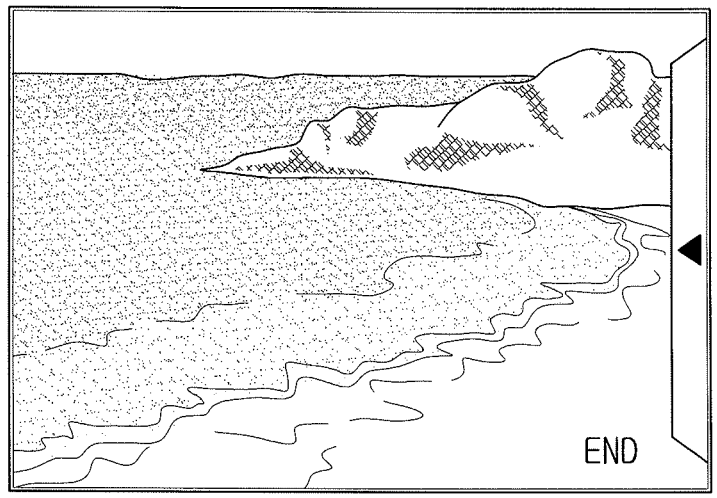
FIGS. 5A and 5B are views illustrating a data structure of an image to be transmitted, according to an exemplary embodiment of the present general inventive concept.

As illustrated in FIG. 4E, the specific image can be transmitted to the external apparatus while displaying a complete notification message at the bottom of the video output unit 272. The method of transmitting the specific image to the external apparatus was described above.

Figure 5B:
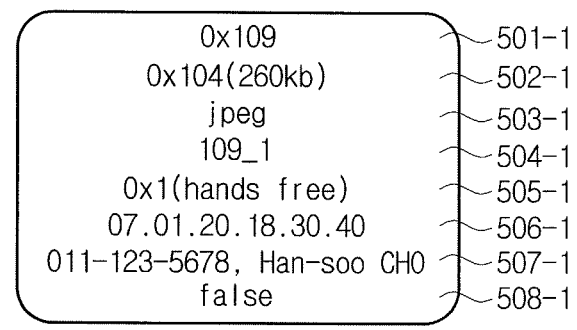

The method by which the controller 290 generates a data structure of an image to be transmitted at operation S345 will be described in detail with reference to FIGS. 5A and 5B. FIGS. 5A and 5B are views regarding a data structure of an image to be transmitted, according to an exemplary embodiment of the present general inventive concept. The data structure can include a moving image ID 501 indicating information regarding a moving image containing an image to be transmitted, the size 502 of an image to be transmitted, the type 503 of an image to be transmitted, a title 504 of an image to be transmitted, a profile type 505 for data transmission between the DVC 110 and first mobile phone 120, the image sending time 506 in the DVC 110 (specifically, the communication interface 240), a receiver list 507, and information 508 regarding whether the receiver is registered.

FIG. 5B illustrates a data structure of a specific image prepared based on the data structure of FIG. 5A. Accordingly, as illustrated in the data structure of FIG. 5B, it is determined that the user of the DVC 110 transmits the same image to the second mobile phone 140 and third mobile phone 150 through the first mobile phone 120.

A method of processing the data received from the second to fourth mobile phones 140 to 160 will be now described in detail using the drawings. For convenience of description, it is assumed that the user of the second mobile phone 140 transmits a comment regarding a specific image in the form of text data, the user of the third mobile phone 150 transmits a comment regarding a specific image in the form of audio data, and the user of the fourth mobile phone 160 transmits text data which is unrelated to the specific image.

Figure 6A:
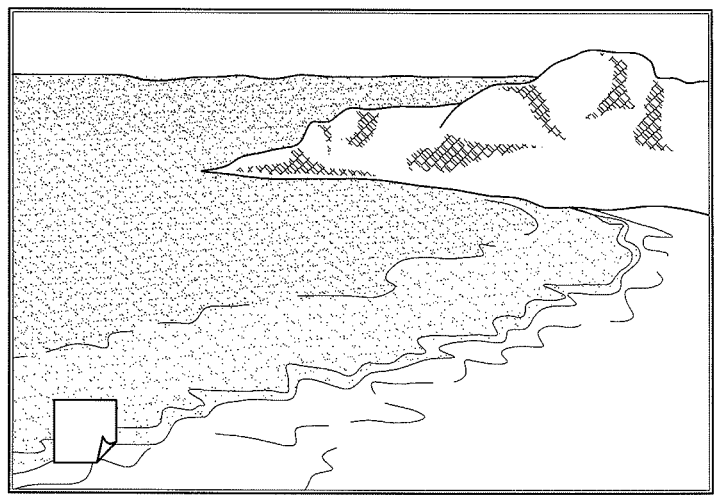
FIGS. 6A to 6C are views illustrating a video output unit when data is received from a second mobile phone.
Figure 6B:
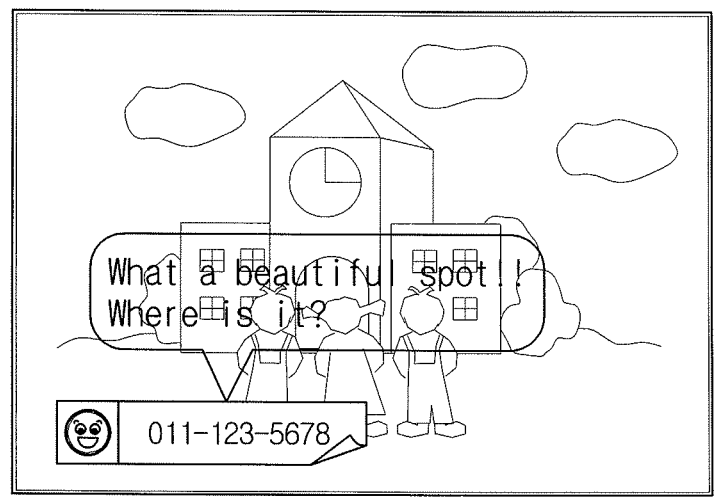
Figure 6C:
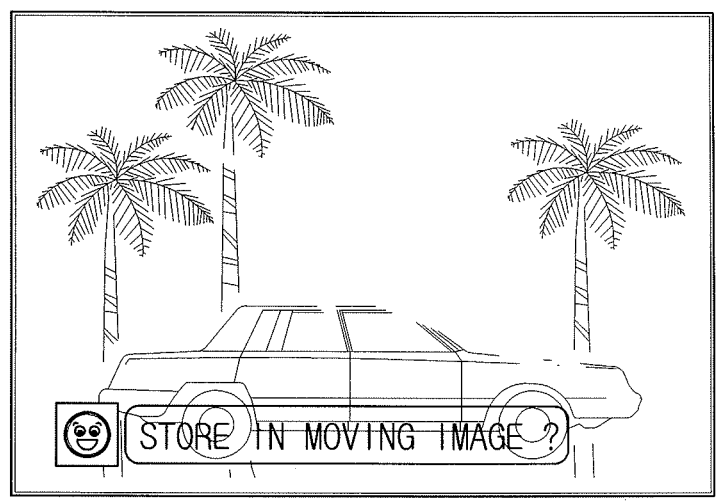

FIGS. 6A to 6C are views regarding the video output unit 272 (FIG. 2) when data is received from the second mobile phone 140 (FIG. 1). As illustrated in FIG. 6A, if the data is received from the second mobile phone 140, an image being photographed can be displayed together with a notification message on the video output unit 272 of the DVC 110.

If the output command is input at operation S360 (FIG. 3), the video output unit 272 of the DVC 110 can display text data "What a beautiful spot!! Where is it?", which is received from the second mobile phone 140, together with an icon corresponding to the second mobile phone 140, as illustrated in FIG. 6B.

If a predetermined period of time has elapsed after the text data is displayed, the words indicating whether to store the data can be displayed, as illustrated in FIG. 6C. Accordingly, the user can input the storage command through the user interface.

If the storage command is input, the controller 290 can generate metadata to connect the data to the image. A data structure of metadata according to the exemplary embodiment of the present general inventive concept is now described with reference to FIGS. 7A to 7D.

FIGS. 7A to 7D are views regarding a data structure of metadata, according to an exemplary embodiment of the present general inventive concept. As illustrated in FIG. 7A, the data structure of the metadata can include the type 701 of received data, the size 702 of the received data, the playback time 703 of the received data, the reception time 704 of the received data, the data transmitter 705, the data content 706, the moving image ID 707 associated with the received data, information 708 regarding whether metadata is generated, a data transmitter icon 709, the next metadata address 710, the previous metadata address 711, information 712 regarding whether an icon is registered, an icon display position 713, and an icon display method 714.

FIG. 7B illustrates a data structure of data received from the second mobile phone 140 (FIG. 1) prior to input of the output command at operation S365 (FIG. 3). As illustrated in FIG. 7B, the data structure of the data received from the second mobile phone 140 includes only the type 701 of the received data, the size 702 of the received data, the reception time 704 of the received data, the data transmitter 705 and the data content 706. The controller 290 (FIG. 2) can generate a data structure of FIG. 7B using only information regarding the data being stored in the temporary storage unit 230 (FIG. 2).

If the output command at operation S365 is input, other information regarding the data can be added to the data structure of FIG. 7B, and thus the controller 290 can generate a data structure illustrated in FIG. 7C. Accordingly, if the output command is input, the text data can be transferred to the video output unit 272 and the icon can also be transferred to the video output unit 272 according to the situation. Accordingly, information regarding the data transmitter icon 709, the information 712 regarding whether an icon is registered, the icon display position 713, and the icon display method 714 can be added to the data structure. Additionally, the data and icons can be output to the image output unit 270 according to the generated data structure.

If the storage command is input, the controller 290 can generate metadata to connect the data to be stored to the image, and in particular, can generate metadata based on whether the data to be stored includes a comment regarding the image. It is assumed that the data received from the second mobile phone 140 is the data associated with the image being photographed, so the data structure illustrated in FIG. 5B is currently stored in the temporary storage unit 230. Accordingly, the controller 290 can generate metadata using the data structures illustrated in FIGS. 5B and 7C.

FIG. 7D illustrates a data structure of metadata (hereinafter, referred to as "first metadata") of the data received from the second mobile phone 140. When generating the first metadata, the controller 290 can check whether the data transmitter 705 exists in the receiver list 507.

If the data transmitter 705 exists in the receiver list 507, the image sending time 506 recorded in the data structure of FIG. 5B can be copied into the playback time 703 of the first metadata, and the moving image ID 501 recorded in the data structure of FIG. 5B can be copied into the moving image ID 707, and accordingly, the first metadata can be generated. The first metadata of the data received from the second mobile phone 140 is illustrated in FIG. 7D, and can be stored in the storage unit 250 in which the image associated with the first metadata is being stored.

This is because the user of the second mobile phone 140 transmits the comment regarding the specific image transmitted by the user of the DVC 110 in the form of text data, so if the user desires to play back the image again after storing the image and metadata, the comment can be played back together with the image which is most closely associated with the data, to thus implement the feeling of movement.

A method of outputting data received from the third mobile phone 150 and a method of generating metadata of the data received from the third mobile phone 150 can be performed similarly to the method of outputting data received from the second mobile phone 140 and the method of generating metadata of the data received from the second mobile phone 140.

Figure 8A:
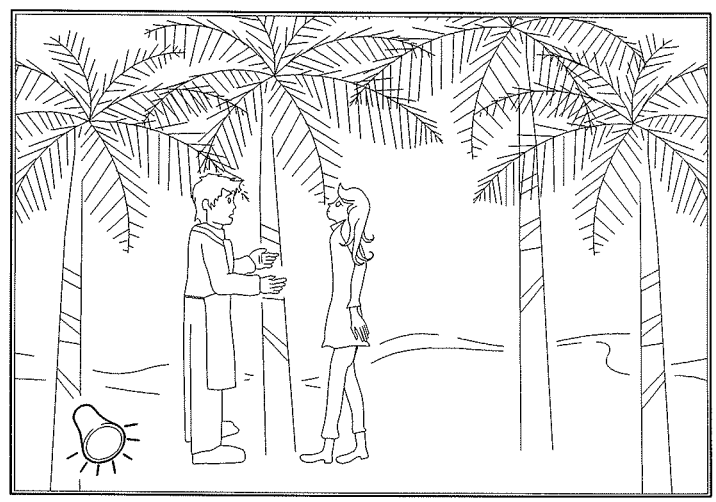
FIGS. 8A to 8D are views illustrating data which is received from a third mobile phone.
Figure 8B:
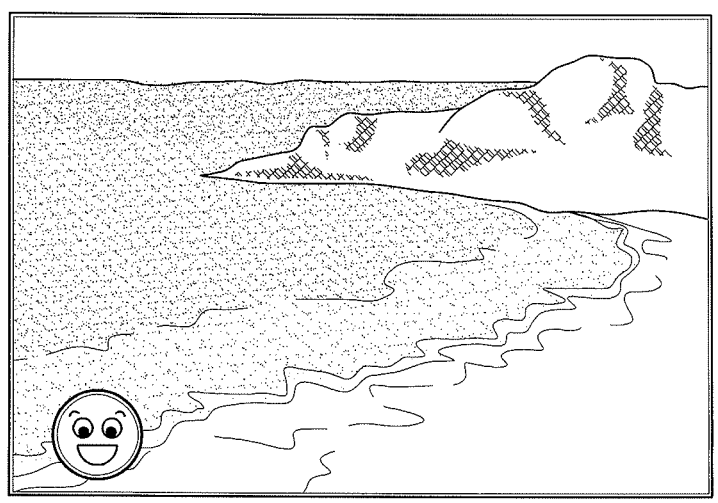

FIGS. 8A to 8D are views illustrating data that is received from the third mobile phone 150. The DVC 110 can receive the audio data from the third mobile phone 150, and thus a notification message different from the notification message of the text data can be displayed on the video output unit 272, as illustrated in FIG. 8A. Additionally, since the audio data can be output from the audio output unit 274, only an icon corresponding to an audio data transmitter can be displayed on the video output unit 272 while outputting the audio data, as illustrated in FIG. 8B.

Figures 8C, 8D:
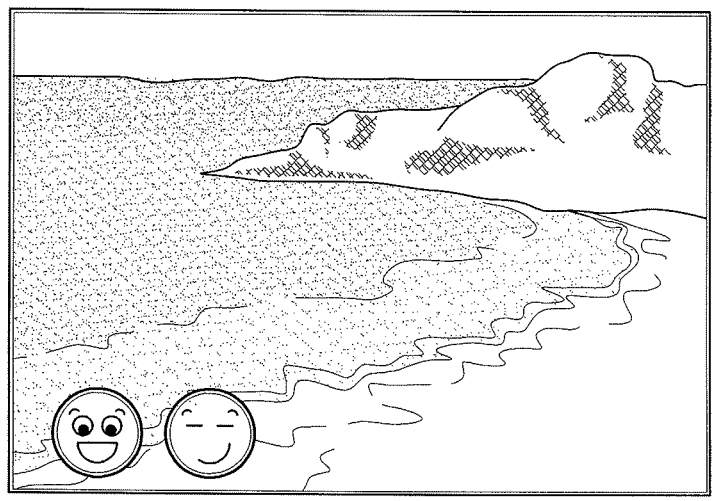

Moreover, if the user of the DVC 110 enters into conversation with the user of the third mobile phone 150 using the audio data, an icon corresponding to the user of the DVC 110 together with an icon corresponding to the user of the third mobile phone 150 can be displayed on the video output unit 272, as illustrated in FIG. 8C. In addition, FIG. 8D illustrates a data structure of generated metadata (hereinafter, referred to as "second metadata") when a storage command to store the audio data received from the third mobile phone 150 is input. The data structure of the second metadata is the same as that of the first metadata, but information contained in the data structures are different from each other.

If the playback time 706-2 of the second metadata is equal to the playback time 706-1 of the first metadata, audio data and text data can have the same playback time when playing back the image. As described above, since the first metadata contains the text data and the second metadata contains the audio data, the data can be output using different methods without causing any problems. However, for example, if all metadata contain text data, that is, if data is output using the same method, the data may be displayed on the video output unit 272 in order of the reception time 704 at a predetermined time interval. Additionally, the metadata may be stored according to the order of the reception time 704. Accordingly, the second metadata address may be recorded in an address 710-1 of metadata next to the first metadata, and the first metadata address may be stored in an address 710-2 of metadata preceding the second metadata.

FIG. 9 is a view illustrating a data structure of third metadata that is generated using data received from the fourth mobile phone 160. Since the data received from the fourth mobile phone 160 is not associated with the image being photographed, the data described in FIGS. 5A and 5B is not stored in the temporary storage unit 230. Accordingly, if the storage command is input, the reception time can be recorded in a data playback time 703-3 because there is no image sending time, and remaining information can be recorded in the same manner as the method by which the controller 290 generates the first metadata.

Hereinafter, a method of playing back an image together with the data received from the external apparatus will be described. FIG. 10 is a view regarding a data structure of image management data. The storage unit 250 may store the image management data, in addition to the image and metadata. If an image file is completely stored in the storage unit 250, the controller 290 can generate image management data using the image and metadata. The data structure of the image management data can include a moving image ID 1001, an address 1002 of metadata which is initially connected to the moving image, an address 1003 of metadata which is finally connected to the moving image, a total number of metadata 1004, a total number of metadata 1005 containing text data, and a total number of metadata 1006 containing audio data.

If a playback command is input, the controller 290 can control an entire operation of the DVC 110 so that the image stored in the storage unit 250 can be played back, and also determine whether metadata exists using the image management data. The image management data contains the address of the first metadata that is an address of metadata that is initially connected to the image, and accordingly, the controller 290 can determine that metadata exists. Additionally, when the moving image is played back while measuring a period of time, if the measured period of time corresponds to the playback time 703-1 of the first metadata, the controller 290 can read the first metadata being stored in the storage unit 250. Next, the controller 290 can check the type of data, and if the data is in the form of text data, the controller 290 can restore the data into re-playable data and transfer the re-playable data to the display information combiner 260. The display information combiner 260 can combine the text data contained in the first metadata with the currently played back image and transfer the combined image to the video output unit 272.

The playback time 703-2 of the second metadata is equal to the playback time 703-1 of the first metadata, and thus the audio data of the second metadata can also be played back when the text data of the first metadata is played back. Accordingly, the audio data contained in the second metadata can be transferred to the CODEC 220. Additionally, the CODEC 220 can decode the compressed audio data into re-playable original audio data and transfer the re-playable original data to the audio output unit 274. When the text data and audio data are played back, the icons corresponding to the text data and audio data can also be displayed on the video output unit 272.

An address of the third metadata, which is the address 710-2 of next metadata, can be recorded in the data structure of the second metadata, and accordingly, the controller 290 can determine the address of the third metadata. The controller 290 can measure the period of time again. Additionally, the measured period of time corresponds to the playback time 703-3 of the third metadata, content 706-3 of the third metadata can be read out. Therefore, using the above-described method, the image can be played back together with the data received from the external apparatus.

As described above, since the text data and audio data can be stored in the storage unit in which the image is stored, the image can also be played back in other playback apparatuses, in addition to the digital camcorder according to the exemplary embodiment of the present general inventive concept.

According to the exemplary embodiment of the present general inventive concept, if data is received from the external apparatus, the notification message can be generated and displayed on the video output unit 272, but the present general inventive concept is not limited thereto. The controller 290 can generate an alarm sound instead of the notification message and transfer the alarm sound to the audio output unit 274, so the audio output unit 274 can output a notification message alarm.

In the exemplary embodiment of the present general inventive concept, if data received using wireless communication is output, the icon corresponding to the data can be displayed, but the present general inventive concept is not limited thereto. All icons associated with data being stored in the file when playing back images for each file unit can be displayed regardless of the playback time of the data. Additionally, if only the photographed image is played back and a user inputs a separate manipulation command, for example, if the user selects a specific icon through the manipulator 280, data corresponding to the selected icon can be played back.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

The exemplary embodiment of the present general inventive concept provides a DVC 110 capable of performing data communication with a mobile phone that is spatially separated from the DVC 110, through a mobile phone, but is not limited thereto. The DVC 110 can directly perform short-range communication with another DVC capable of performing short-range communication.

The exemplary embodiment of the present general inventive concept can be transferred to a photographing apparatus to photograph an image. Accordingly, a digital camera, a camera for a mobile phone or other devices can be used in the exemplary embodiment of the present general inventive concept, in addition to the digital camcorder of the exemplary embodiment of the present general inventive concept.

As described above, the photographing apparatus according to the exemplary embodiment of the present general inventive concept can communicate with the external apparatus while photographing images. Additionally, the photographing apparatus can generate the data received from the external apparatus in the form of metadata and store the generated metadata together with the image, thus enhancing user convenience.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An electronic device comprising:
    an image pickup unit to acquire a moving image of a subject;
    an image processing unit to process signals output from the image pickup unit and to generate video image data;
    a display unit to display the video image data;
    a memory unit to store the video image data; and
    a controller to control the display unit to simultaneously display the video image data and display a notification message in response to receiving a text data sent by an external device while photographing the moving image of the subject,
    wherein the notification message indicates that the text data has been received, wherein the notification message includes information on contents of the text data, wherein the controller controls the display unit to display the contents of the text data in response to receiving a first user input while the video image data and the notification image are displayed, and wherein the controller controls the memory unit to attach the text data to the video image data as metadata in response to receiving a second user input while the video image data and the notification image are displayed.

2. The device as claimed in claim 1, wherein the information on the contents of the text data comprises a phone number of a sender.

3. The device as claimed in claim 1, wherein the information on the contents of the text data comprises a name of a sender.

4. The device as claimed in claim 3, wherein a pre-stored contact address window is displayed in response to receiving a third user input.

5. The device as claimed in claim 1, wherein a contact address of the external device is input and stored, and wherein the notification message is displayed with the contact address.

6. The device as claimed in claim 1, wherein the controller generates an alarm sound in response to receiving the text data.

* * * * *

UNITED STATES PATENT AND TRADEMARK OFFICE
CERTIFICATE OF CORRECTION

PATENT NO. : 8,848,085 B2  Page 1 of 1
APPLICATION NO. : 11/781996
DATED : September 30, 2014
INVENTOR(S) : Seung-hun O It is certified that error appears in the above-identified patent and that said Letters Patent is hereby corrected as shown below:

In the Claims

Column 14, line 35, in claim 1, delete "receiving a" and insert -- receiving --, therefor.

Signed and Sealed this
Nineteenth Day of May, 2015

Michelle K. Lee
*Director of the United States Patent and Trademark Office*